US012668543B2

(12) United States Patent
Soudier et al.

(10) Patent No.: US 12,668,543 B2
(45) Date of Patent: Jun. 30, 2026

(54) DRY GRINDING OF STEEL MAKING SLAG, GROUND STEEL MAKING SLAG, AND ITS USE IN CONSTRUCTION MATERIALS

(71) Applicant: SIKA TECHNOLOGY AG, Baar (CH)

(72) Inventors: Jerome Soudier, Vaux en Bugey (FR); Olivier Levesque, Crémieu (FR); Javier Quesada, Madrid (ES); Joris Gouy-Pailler, Lyons (FR); Ramiro Garcia, Madrid (ES)

(73) Assignee: SIKA TECHNOLOGY AG, Baar (CH)

( * ) Notice: Subject to any disclaimer, the term of this patent is extended or adjusted under 35 U.S.C. 154(b) by 317 days.

(21) Appl. No.: 18/283,985

(22) PCT Filed: Mar. 23, 2022

(86) PCT No.: PCT/EP2022/057627

§ 371 (c)(1),
(2) Date: Sep. 25, 2023

(87) PCT Pub. No.: WO2022/200425

PCT Pub. Date: Sep. 29, 2022

(65) Prior Publication Data

US 2024/0174570 A1 May 30, 2024

(30) Foreign Application Priority Data

Mar. 26, 2021 (EP) .................................... 21305382

(51) Int. Cl.

| | |
|---|---|
| ***C04B 28/08*** | (2006.01) |
| ***C04B 24/00*** | (2006.01) |
| ***C04B 24/02*** | (2006.01) |
| ***C04B 24/06*** | (2006.01) |
| ***C04B 24/10*** | (2006.01) |
| ***C04B 24/12*** | (2006.01) |
| ***C04B 24/28*** | (2006.01) |
| ***C04B 40/00*** | (2006.01) |
| ***C04B 103/00*** | (2006.01) |
| ***C04B 103/32*** | (2006.01) |
| ***C04B 103/50*** | (2006.01) |

(52) U.S. Cl.

CPC .......... *C04B 28/082* (2013.01); *C04B 24/003* (2013.01); *C04B 24/023* (2013.01); *C04B 24/06* (2013.01); *C04B 24/10* (2013.01); *C04B 24/122* (2013.01); *C04B 24/287* (2013.01); *C04B 40/0042* (2013.01); *C04B 2103/0051* (2013.01); *C04B 2103/32* (2013.01); *C04B 2103/50* (2013.01)

(58) Field of Classification Search

CPC ... C04B 28/082; C04B 24/003; C04B 24/023; C04B 24/06; C04B 24/10; C04B 24/122; C04B 24/287; C04B 40/0042; C04B 2103/0051; C04B 2103/32; C04B 2103/50; C04B 28/10; C04B 28/006; C04B 18/142; C04B 28/02; C04B 28/08

See application file for complete search history.

(56) References Cited

FOREIGN PATENT DOCUMENTS

| | | | | | |
|---|---|---|---|---|---|
| CN | 103253876 A | | 8/2013 | | |
| CN | 104692706 A | | 6/2015 | | |
| CN | 104891842 A | * | 9/2015 | ............. | C04B 24/12 |
| CN | 107382116 A | * | 11/2017 | ........... | C04B 18/142 |
| EP | 3315471 A1 | | 5/2018 | | |
| JP | 2016-124719 A | | 7/2016 | | |
| WO | 2007/013087 A1 | | 2/2007 | | |
| WO | 2017194329 A1 | | 11/2017 | | |

OTHER PUBLICATIONS

Zhu et al., "Enhance hydration properties of steel slag using grinding aids by mechanochemical effect," Construction and Building Materials, 2012, vol. 29, pp. 476-481.

Jul. 11, 2022 International Search Report issued in International Patent Application No. PCT/EP2022/057627.

Jul. 11, 2022 Written Opinion issued in International Patent Application No. PCT/EP2022/057627.

Xi et al., "Enhance hydration properties of steel slag using grinding aids by mechanochemical effect," Construction and Building Materials, 29, pp. 476-481, 2012.

Yumin, "Research of the Effect of Different Dosage of Grinding Aids on Properties and Process Parameters of Steel Slag Power," American Journal of Materials Synthesis and Processing, 3(2), pp. 34-38, 2018.

Chen Mi-mi et al., "Preparation and Properties of a Composite Grinding Aid for Steel Slag and Granulated Blast Furnance Slag," International Symposium on Material, Energy and Environment Engineering, pp. 61-63, 2015.

* cited by examiner

*Primary Examiner* — Anthony J Green
(74) *Attorney, Agent, or Firm* — Oliff PLC

(57) ABSTRACT

The use of a grinding additive during the dry grinding of steel making slag, characterized in that the grinding additive is selected from the group consisting of alkanolamines, glycols, glycerol, sugars, sugar acids, carboxylic acids or their salts, superplasticizers, superabsorbent polymers, or mixtures thereof. Also, ground steelmaking slag including the additives and the use of the ground steel making slag in construction materials.

15 Claims, No Drawings

DRY GRINDING OF STEEL MAKING SLAG, GROUND STEEL MAKING SLAG, AND ITS USE IN CONSTRUCTION MATERIALS

TECHNICAL FIELD

The present invention relates to the dry grinding of steel making slag in the presence of grinding additives selected from alkanolamines, glycols, glycerol, sugars, sugar acids, carboxylic acids or their salts, superplasticizers, superabsorbent polymers, or mixtures thereof. The present invention also relates to ground steelmaking slag comprising said additives and their use in construction materials.

BACKGROUND

Cement-based building materials, especially concrete or mortars, rely on cementitious materials as binders. Cementitious binders typically are hydraulic binders the most abundant of which are cements and especially Ordinary Portland Cement. However, the use of cements and especially of Ordinary Portland Cement has a high environmental footprint. One major reason are the high $CO_2$ emissions associated with the manufacture of cements. Many efforts have thus been made to at least partially replace cements as binders from building materials.

One possibility is the use of materials with cementitious properties, pozzolanes and/or latent hydraulic materials as cement replacement. An especially appealing material of this kind is slag as it is available as a by-product of various metallurgical process, especially steel making, in large quantities.

One specific type of steel making slag is converter slag, also called Basic Oxygen Furnace (BOF) slag. BOF slag is generated during the steel making process when raw iron is oxidized in the converter by oxygen to reduce the carbon content of the raw iron.

Raw steel making slag typically is in the form of granules and, just like cement, needs to be ground in a compressive grinder or an attrition mill to obtain a powder product with a fineness suitable to be used in construction materials. Possible ways of grinding a slag is by the use of a vertical roller mill or a ball mill. In a vertical roller mill, a compressive force on the slag granules is exerted by rotating cylinders while in a ball mill the impact of balls on the granules leads to their disintegration. In any case a powder with defined fineness can be obtained. The grinding can be done in a dry state or in a wet state, e.g. where the steel making slag is suspended in water.

It also well known in the art of cement grinding or slag grinding that various grinding additives can be used during grinding to improve the overall efficiency of the grinding process.

WO 2017/194329 discloses a method for the wet grinding of slag where a grinding additive selected from polycarboxylate ether, phosphate polycondensation product, lignosulfonate, melamine-formaldehyde sulfonate, alkanolamine, amino acid, sugar, molasse, or calcium silicate hydrate is added.

Dry grinding of slag can be advantageous over wet grinding because the resulting ground slag does not need to be additionally dried before being formulated for example in dry mortars.

Dry grinding of granulated blast furnace slag (GBFS) with the addition of triethanolamine, polyethylene glycol, or ethanol has been described previously (Filio et al in "The fine grinding of GBFS quenched by water and its reactivity during grinding" Shigen-to-Sozai, 107(11), 1991, 795-799).

Dry grinding of basic oxygen furnace slag has been described in EP3315471.

Due to its intrinsic nature steel making slag is more difficult to grind than other hydraulic binders such as for example Portland cement clinker or granulated blast furnace slag. This is because steel making slags typically have a higher intrinsic hardness and fracture resistance. Furthermore, due to their phase composition, steel making slags have a higher tendency to generate ultra-fine particles during grinding. Such ultra-fine particles may lead to a soft character, increased stickiness, and higher tendency to agglomerate on the grinding media (e.g. the balls in a ball mill), the grinding vessel, or around slag particles of bigger size. Such agglomeration frequently results in lower grinding efficiency and/or in a more difficult air classification in case of continuous grinding.

There is still a need for improved methods of grinding steel making slag, and especially basic oxygen furnace slag. Specifically, the dry grinding of steel making slags, and especially of BOF slag, needs to be improved.

SUMMARY OF THE INVENTION

It is the objective of the present invention to provide methods for the dry grinding of steel making slag. Especially, the efficiency of the dry grinding of steel making slag is to be improved. It is also an object of the present invention to provide improved ground steel making slag which can be used to make construction materials.

Surprisingly, it has been found that the objectives of the present invention can be solved by the subject-matter of the independent claims.

Especially, the use of grinding additives selected from alkanolamines, glycols, glycerol, sugars, sugar acids, carboxylic acids or their salts, superplasticizers, superabsorbent polymers, or mixtures thereof, in the dry grinding of steel making slag leads to an improvement in grinding efficiency and to improved ground steel making slag comprising these additives.

The efficiency of the dry grinding of steel making slag, and especially of basic oxygen furnace slag, can be improved by the use of said additives. Specifically, a higher Blaine surface of ground steel making slag is obtained when grinding is effected for the same time with said additives being present as compared to when no additives are present. Additionally, the amount of ground steel making slag sticking to grinding tools (e.g. balls and vessel of a ball mill) is significantly reduced when additives of the present invention were used.

It has also surprisingly been found that the use of a steel making slag dry ground in the presence of a grinding additive of the present invention improves the performance of a construction material comprising said slag as compared to the same construction material comprising a slag ground without said additives. Especially the early strength of the construction material is improved when a steel making slag dry ground in the presence of a grinding additive is used.

Other aspects of the present invention are the subject of independent claims. Preferred embodiments of the present invention are the subject of dependent claims.

WAYS OF CARRYING OUT THE INVENTION

Within the present context the terms milling and grinding have the same meaning and can be exchanged.

In a first aspect the present invention relates to the use of a grinding additive during the dry grinding of steel making slag, characterized in that the grinding additive is selected from the group consisting of alkanolamines, glycols, glycerol, sugars, sugar acids, carboxylic acids or their salts, superplasticizers, superabsorbent polymers, or mixtures thereof.

Steel making slag within the present context is a by-product from the steelmaking process. Steel making slag is obtained for example in the Thomas process, the Linz-Donawitz process, the Siemens-Martin process or the electric arc furnace when iron is converted to steel. Steel making slag is generated when hot raw iron is treated with oxygen to remove carbon and other elements that have a higher affinity to oxygen than iron. Typically, fluxes and/or elements to fix impurities are added during the process, such as limestone or dolomite. Fluxes and fixing aids combine with silicates and oxides to form the liquid slag.

Liquid slag is then separated from the crude steel and cooled in pits or ground bays to form crystalline or partly crystalline steel making slag. The cooled slag may then be crushed, milled, and sieved to a desired fineness. Preferentially, steel making slag of the present invention is a type of slag which has not been additionally treated in the hot state or during the cooling process.

The particle size of a steel making slag can be analyzed by sieve analysis as described for example in standard ASTM C136/C136M. The process separates fine particles from more course particles by passing the material through a number of sieves of different mesh sizes. The material to be analysed is vibrated through a series of sequentially decreasing sieves using a single, or combination of horizontal, vertical or rotational motion. As a result, the percentage of particles retained on a sieve of a given size is given.

According to embodiments, a steel making slag has a particle size prior to grinding as measured according to standard ASTM C136/C136M with a retention of not more than 10 w %, preferably not more than 5 w %, especially not more than 1 w % on a 6 mm sieve.

Another measure for the fineness of a steel making slag is the Blaine surface. The Blaine surface can be determined according to NF EN 196-6. According to a preferred embodiment, the steel making slag prior to grinding has a Blaine surface of between 1000-4000 $cm^2/g$. It is, however, also possible to use a steel making slag with a higher specific surface or with a lower specific surface.

Steel making slag can be any slag resulting from the making of steel. Especially, steel making slag is any of granulated blast furnace slag (GBFS), basic oxygen furnace slag (BOF slag), ladle slag or electric arc furnace slag. It is, however, preferred that the steel making slag is not granulated blast furnace slag.

A very preferred type of steel making slag within the present context is basic oxygen furnace slag (BOF). Another common name for basic oxygen furnace slag is basic oxygen slag (BOS). The chemical composition of a BOF slag can be determined by XRF as described in ASTM D5381-93. A typical BOF slag has a chemical composition with 27-60 wt.-% of CaO, 8-38 wt.-% of iron oxides, 7-25 wt.-% of $SiO_2$, 1-15 wt.-% of MgO, 1-8 wt.-% of $Al_2O_3$, 0.5-8 wt.-% of MnO, 0.05-5 wt.-% of $P_2O_5$, and some minor components, especially oxides of Ti, Na, K, and Cr, with <1 wt.-%. The chemical composition of a BOF slag may vary depending on steel plant and depending on operation parameter of the basic oxygen furnace. Especially preferred BOF slag has a chemical composition with 35-55 wt.-% of CaO, 10-30 wt.-% of iron oxides, 10-20 wt.-% of $SiO_2$, 2-10 wt.-% of MgO, 1-5 wt.-% of $Al_2O_3$, 0.5-5 wt.-% of MnO, 0.5-3 wt.-% of $P_2O_5$, and some minor components, especially oxides of Ti, Na, K, and Cr, with <1 wt.-%.

An preferred steel making slag, especially a basic oxygen furnace slag, has a content of iron oxides expressed as $Fe_2O_3$ of 8-38 w %, preferably of 10-30 wt.-%, and a content of sulfur expressed as $SO_3$ of <1 w %, preferably <0.5 w %, especially <0.1 w %, in each case relative to the total dry weight of the steel making slag.

It is especially preferred, that the steel making slag does not comprise Dicalciumsilicate (C2S, belite) in an amount of more than 66 wt.-% relative to the total dry weight of the slag.

The term “dry grinding” within the present context refers to a grinding operation where there is a very low content of water present or better essentially no water present. A very low content of water means that the water content during the grinding of a steel making slag is below 1 w %, preferably below 0.1 w %, more preferably equal to or below 0.06 w %, in each case relative to the total weight of the steel making slag. According to embodiments, the amount of water present during grinding is not higher than 1 w %, preferably 0.1 w %, more preferably 0.06 w %, relative to the total dry weight of the slag The grinding additive is selected from the group consisting of alkanolamines, glycols, glycerol, sugars, sugar acids, carboxylic acids or their salts, superplasticizers, superabsorbent polymers, or mixtures thereof.

Suitable alkanolamines are preferably selected from the group consisting of monoethanolamine, diethanolamine, triethanolamine (TEA), diethanolisopropanolamine (DEIPA), ethanoldiisopropanolamine (EDIPA), isopropanolamine, diisopropanolamine, triisopropanolamine (TIPA), N-methyldiisopropanolamine (MDIPA), N-methyldiethanolamine (MDEA), tetrahydroxyethylethylenediamine (THEED), and tetrahydroxyiso-propylethylenediamine (THIPD), as well as mixtures of two or more of these alkanolamines.

Triethanolamine is not to be used where the steel making slag is granulated blast furnace slag.

Especially preferred alkanolamines are TIPA, MDIPA, MDEA, DEIPA, EDIPA, THEED, and THIPD. Most preferred alkanolamines are TIPA and DEIPA.

Several regioisomers exist of TIPA. Throughout the present invention, preferred regioisomers of TIPA are 1,1',1"-nitrilotris(propan-2-ol) and 1,1',1"-nitrilotris(propan-1-ol). Preferably, throughout the present invention, TIPA is not 2,2',2"-nitrilotris(propan-1-ol).

Examples of suitable glycols are monoethylene glycol, diethylene glycol, triethylene glycol, tetraethylene glycol, pentaethylene glycol, polyethylene glycol, in particular with 6 or more ethylene units, e.g. PEG 200, neopentyl glycol, hexylene glycol, propylene glycol, dipropylene glycol and polypropylene glycol. It is also possible to use mixtures of two or more different glycols as well as of at least one glycol and glycerol.

In one embodiment, the glycerol is a so-called bio-glycerine, which can be produced from a renewable raw material.

A “sugar” in the sense of the present invention is a carbohydrate having an aldehyde group. In particularly preferred embodiments, the sugar belongs to the group of monosaccharides or disaccharides. Examples of sugars include, but are not limited to, glyceraldehyde, threose, erythrose, xylose, lyxose, ribose, arabinose, allose, altrose, glucose, mannose, gulose, idose, galactose, tallose, fructose, sorbose, lactose, maltose, sucrose, lactulose, trehalose, cellobiose, chitobiose, isomaltose, palatinose, mannobiose, raffinose and xylobiose. Sugars can also be used in form of e.g. vinasse, molasse.

A "sugar acid" in the context of the present invention is a monosaccharide having a carboxyl group. It may belong to any of the classes of aldonic acids, ursonic acids, uronic acids or aldaric acids. Preferably, it is an aldonic acid. Examples of sugar acids useful in connection with the present invention include, but are not limited to, glyceric acid, xylon acid, gluconic acid, ascorbic acid, neuraminic acid, glucuronic acid, galacturonic acid, iduronic acid, tartaric acid, mucilic acid and saccharic acid. The sugar acid may be in the form of the free acid or as a salt. According to embodiments, salts of sugar acids may be salts with metals of groups Ia, IIa, Ib, IIb, IVb, VIIIb of the periodic table of elements. Preferred salts of sugar acids are salts of alkali metals, alkaline earth metals, iron, cobalt, copper or zinc. Especially preferred are salts with monovalent metals such as lithium, sodium and potassium.

The term "carboxylic acid" means any organic molecule with a carboxylate group, except sugar acids. Especially preferred carboxylic acids are oxalic acid, malonic acid, adipic acid, lactic acid, citric acid, and tartaric acid. The carboxylic acid may be in the form of the free acid or in the form of a salt. Thus, throughout the present invention, where reference is made to carboxylic acid or to a specific carboxylic acid, such reference is meant to encompass the fully protonated form of the respective carboxylic acid as well as any salts thereof. According to embodiments, salts of carboxylic acids may be salts with metals of groups Ia, IIa, Ib, IIb, IVb, VIIIb of the periodic table of elements. Preferred salts of sugar acids are salts of alkali metals, alkaline earth metals, iron, cobalt, copper or zinc. Especially preferred are sodium, potassium, or calcium salts of carboxylic acids, in particular sodium, potassium, or calcium salts of citric acid.

The term "superabsorbent polymers" refers to polymers that can absorb large amounts of water. When superabsorbent polymers come into contact with water, the water molecules diffuse into the cavities of the polymer network and hydrate the polymer chains. The polymer can thus swell and form a polymer gel or slowly dissolve. This step is reversible, so the superabsorbent polymers can be regenerated to their solid state by removing the water. The water absorption property is denoted by the swelling ratio, by which is meant the ratio of the weight of a swollen superabsorbent polymer to its weight in the dried state. The swelling ratio is influenced by the degree of branching of the superabsorbent polymer, any crosslinking that may be present, the chemical structure of the monomers that form the superabsorbent polymer network, and external factors such as the pH, ion concentration of the solution, and temperature. Because of their ability to interact with water, superabsorbent polymers are also referred to as hydrogels.

Examples of superabsorbent polymers useful in the context of the present invention include but are not limited to natural polymers, such as starch, cellulose, such as cellulose ether, chitosan or collagen, alginates, synthetic polymers, such as poly(hydroxyethyl methacrylate), poly(ethylene glycol) or poly(ethylene oxide) or ionic synthetic polymers, such as polyacrylic acid (PAA), polymethacrylic acid (PMAA), polyacrylamides (PAM), polylactic acid (PLA), polyethyleneimine, polyvinyl alcohol (PVA) or polyvinylpyrrolidone.

Superabsorbent polymers that are particularly suitable in the context of the present invention are ionic superabsorbent polymers, in particular those based on polyacrylamide modified with acrylic acid, which can be of either linear or crosslinked structure.

Superplasticizers useful as grinding additives especially are polycarboxylate ether and/or polycarboxylate ester (PCE).

PCEs of the Present Invention Comprise (i) Repeating units A of the general structure (I),

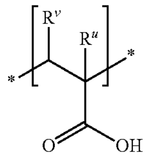

(I)

and (ii) repeat units B of the general structure (II),

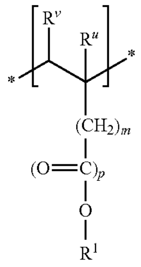

(II)

wherein each Ru independently represents hydrogen or a methyl group, each Rv independently represents hydrogen or COOM, wherein M independently is H, an alkali metal, or an alkaline earth metal, m=0, 1, 2 or3, p=0 or1 each R1 is independently —(CH2)z-[YO]n-R4, where Y is a C2 to C4 alkylene and R4 is H, C1 to C20 alkyl, -cyclohexyl, -alkylaryl, or a —N(—Ri)j-[(CH2)z-PO3M]3-j, z=0, 1, 2, 3, or 4 n=2-350, j=0, 1 or 2, Ri represents a hydrogen atom or an alkyl group having 1-4 carbon atoms, and M represents a hydrogen atom, an alkali metal, an alkaline earth metal or an ammonium ion, and wherein the repeating units A and B in the PCE have a molar ratio of A:B in the range of 10:90-90:10.

In a preferred embodiment, n=10-250, more preferably 30-200, particularly preferably 35-200, especially 40-110.

In a further preferred embodiment, z=0. In a further preferred embodiment, z=4.

In a particularly preferred embodiment, the PCE comprises repeating units A of the general structure (I) as well as repeating units B of the general structure (II), the molar ratios of A to B being in the range of 20: 80-80:20, more preferably 30: 70-80:20, in particular 35:65-75:25.

A PCE preferably has an average molar mass Mw in the range of 1,000-1,000,000, more preferably 1,500-500,000, most preferably 2,000-100,000, in particular 3,000-75,000 or 3,000-50,000 g/mol. The molar mass Mw is determined in the present case by gel permeation chromatography (GPC) with polyethylene glycol (PEG) as standard. This technique is known per se to the skilled person.

PCEs according to the invention can be random or non-random copolymers. Non-statistical copolymers are in particular alternating copolymers or block or gradient copolymers or mixtures thereof.

According to embodiments, the grinding additive is selected from triisopropanolamine (TIPA), triethanolamine (TEA), diethanolisopropanolamine (DEIPA), ethanoldiisopropanolamine (EDIPA), or mixtures of at least one of TIPA, TEA, DEIPA, and EDIPA with at least one of diethylene glycol, glycerol, carboxylic acid, and sugar.

According to preferred embodiments, the grinding additive is selected from the group consisting of triisopropanolamine (TIPA), triethanolamine (TEA), diethanolisopropanolamine (DEIPA), ethanoldiisopropanolamine (EDIPA), lactic acid, malonic acid, adipic acid, citric acid, galactose, glucose, lactose, maltose, sucrose, fructose, diethylene glycol, glycerol, or mixtures thereof.

According to especially preferred embodiments, the grinding additive is TIPA, DEIPA, or a mixture of TIPA and DEIPA, or a mixture of TIPA and citric acid, or a mixture of TIPA and glucose, or a mixture of TIPA and fructose, or a mixture of TIPA and glycerol, or a mixture of TIPA and diethylene glycol, or a mixture of TIPA and sugar and glycerol, or a mixture of TIPA and sugar and diethylene glycol, or a mixture of TIPA and carboxylic acid and glycerol, or a mixture of TIPA and carboxylic acid and diethylene glycol, or a mixture of DEIPA and citric acid, or a mixture of DEIPA and glucose, or a mixture of DEIPA and fructose, or a mixture of DEIPA and glycerol, or a mixture of DEIPA and diethylene glycol, or a mixture of DEIPA and sugar and glycerol, or a mixture of DEIPA and sugar and diethylene glycol, or a mixture of DEIPA and carboxylic acid and glycerol, or a mixture of TIPA and carboxylic acid and diethylene glycol. The sugar being preferably galactose, glucose, lactose, maltose, sucrose, or fructose.

According to embodiments, where the grinding additive is a mixture of TIPA and a sugar, preferably galactose, glucose, lactose, maltose, sucrose, or fructose, the molar ratio of TIPA:sugar is 1:1.

According to embodiments, where the grinding additive is a mixture of TIPA and DEIPA, the weight ratio is 1:1. According to embodiments, where the grinding additive is a mixture of TIPA and glycerol, or is a mixture of TIPA and diethylene glycol, or is a mixture of DEIPA and glycerol, or is a mixture of DEIPA and diethylene glycol, the respective weight ratio is 1:1 or higher, especially 9:1-1:1.

Especially preferred embodiments of the present invention are the use of a grinding additive selected from TIPA, TEA, DEIPA, EDIPA, lactic acid, malonic acid, adipic acid, citric acid, galactose, glucose, lactose, maltose, sucrose, fructose, diethylene glycol, glycerol, or mixtures thereof for the dry grinding of basic oxygen furnace slag. According to special embodiments of the present invention, the grinding additive is TIPA, DEIPA, or is a mixture of TIPA and DEIPA, or is a mixture of TIPA and citric acid, or is a mixture of TIPA and glucose, or is a mixture of TIPA and fructose, or is a mixture of TIPA and glycerol, or is a mixture of TIPA and diethylene glycol, or is a mixture of TIPA and sugar and glycerol, or is a mixture of TIPA and sugar and diethylene glycol, or is a mixture of TIPA and carboxylic acid and glycerol, or is a mixture of TIPA and carboxylic acid and diethylene glycol, or is a mixture of DEIPA and citric acid, or is a mixture of DEIPA and glucose, or is a mixture of DEIPA and fructose, or is a mixture of DEIPA and glycerol, or is a mixture of DEIPA and diethylene glycol, or is a mixture of DEIPA and sugar and glycerol, or is a mixture of DEIPA and sugar and diethylene glycol, or is a mixture of DEIPA and carboxylic acid and glycerol, or is a mixture of TIPA and carboxylic acid and diethylene glycol.

Grinding additives may be added to the steel making slag before and/or during grinding in a total amount of between 0.001-3 w %, preferably 0.002-1 w %, more preferably 0.01-0.1 w %, in each case relative to the total dry weight of the slag.

A grinding additive of the present invention may additionally comprise a defoamer. Suitable defoamers are selected from mineral oils, vegetable oils, or white oils which may comprise a wax and/or hydrophobic silica, silicones, which can be modified by alkoxylation or fluorination, alkyl esters of phosphoric or phosphonic acid, especially triisobutyl phosphate or tributyl phosphate, alkoxylated polyols, especially ethoxylated diols, fatty acid based defoamers, especially mono- and diglycerides of fatty acids, and alkoxylated fatty alcohols. One especially preferred defoamer is tri-isobutyl phosphate.

It is preferred that fines and/or the powdery material are removed from the grinding zone during grinding. This increases grinding efficiency. The removal preferably is done continuously, for example by blowing air through the grinding zone.

The method of the present invention may additionally comprise a step of separating the ground slag according to particle size. According to embodiments, separation is effected at a predefined cut-off particle size in order to retrieve ground slag with a particle size of at least the predefined cut-off particle size and/or in order to retrieve ground slag with a particle size below the predefined cut-off particle size. According to further embodiments, it is also possible to separate the ground slag into fractions of different particle size.

According to embodiments, separation is done by filtration, sieving, sedimentation, density separation, wind sifting, e.g. in cyclones, and/or centrifugation.

The method of the present invention can be done in a batch process or in a continuous process. Installations, especially grinders and mills, useful for the practice of the present invention are not particularly limited and are known per se. According to embodiments, the grinding is done in an attrition mill or a compressive grinder, especially in a ball mill or in a vertical roller mill. However, other mill types such as for example hammer mills, pebble mills, cone mills, E-mills, or jaw crushers are likewise suitable.

According to embodiments, dry grinding of the steel making slag is done in a ball mill with steel balls of a diameter between 0.5-3 mm. A weight ratio of slag:steel balls is between 1:1 and 20:1. The time for dry grinding may vary between 1 minute and 3 hours, preferably 5 minutes and 1 hour, especially 10-30 minutes.

In a second aspect the present invention also relates to a ground steel making slag obtained by dry grinding a steel making slag in the presence of a grinding additive selected form the group consisting of alkanolamines, glycols, glycerol, sugars, sugar acids, carboxylic acids or their salts, superplasticizers, superabsorbent polymers, or mixtures thereof.

It is to be understood that all features and embodiments described above as being preferred also relate to the ground steel making slag.

In some embodiments, the present invention thus relates to a ground basic oxygen furnace slag obtained by dry grinding a basic oxygen furnace slag in the presence of a grinding additive selected from TIPA, TEA, DEIPA, EDIPA, lactic acid, malonic acid, adipic acid, citric acid, galactose, glucose, lactose, maltose, sucrose, fructose, diethylene glycol, glycerol, or mixtures thereof, preferably TIPA, DEIPA, or a mixture of TIPA and DEIPA, or a mixture of TIPA and citric acid, or a mixture of TIPA and glucose, or a mixture of TIPA and fructose, or a mixture of TIPA and glycerol, or a mixture of TIPA and diethylene glycol, or a mixture of TIPA and sugar and glycerol, or a mixture of TIPA and sugar and diethylene glycol, or a mixture of TIPA and carboxylic acid and glycerol, or a mixture of TIPA and carboxylic acid and diethylene glycol, or a mixture of DEIPA and citric acid, or a mixture of DEIPA and glucose, or a mixture of DEIPA and fructose, or a mixture of DEIPA and glycerol, or a mixture of DEIPA and diethylene glycol, or a mixture of DEIPA and sugar and glycerol, or a mixture of DEIPA and sugar and diethylene glycol, or a mixture of DEIPA and carboxylic acid and glycerol, or a mixture of TIPA and carboxylic acid and diethylene glycol.

According to embodiments, the steel making slag is a basic oxygen furnace slag and the grinding additive is triisopropanolamine (TIPA), diethanolisopropanolamine (DEIPA), ethanoldiisopropanolamine (EDIPA), lactic acid, malonic acid, adipic acid, citric acid, galactose, glucose, lactose, maltose, sucrose, fructose, diethylene glycol, glycerol, or mixtures thereof.

It is preferred that the ground steel making slag obtained as explained above has a Blaine surface which is higher than the steel making slag prior to grinding. Specifically, the Blaine surface is increased by more than 10%, preferably more than 50%, especially more than 100%.

According to embodiments, the ground steel making slag of the present invention has a Blaine surface of 2000-12000 $cm^2/g$, preferably 3000-10000 $cm^2/g$, more preferably 4000-9000 $cm^2/g$, especially 6000-8000 $cm^2/g$.

According to embodiments, the ground steel making slag is characterized by a residue on a 45 μm sieve of not more than 25% and/or by a residue on a 32 μm sieve of not more than 45%, preferably not more than 35%.

In a third aspect the present invention relates to a construction material, especially a mortar or concrete, comprising a ground steel making slag as described above.

The ground steel making slag of the present invention is used in the construction material as binder, as part of the binder, and/or as an aggregate. Preferably, the construction material of the present invention additionally comprises at least one mineral binder and optionally further aggregates. Preferably, the at least one mineral binder is selected from the group consisting of cement, gypsum, lime, latent hydraulic binders, pozzolanes, and geopolymers. Cements can in particular be Portland cements as described in standard EN 197-1, calcium aluminate cements as described in standard EN 14647, and/or calcium sulfoaluminate cements. The term "gypsum" is meant to encompass $CaSO_4$ in various forms, in particular $CaSO_4$ anhydrite, $CaSO_4$ α- and β-hemihydrate, and $CaSO_4$ dihydrate. The term "lime" is meant to encompass natural hydraulic lime, formulated lime, hydraulic lime, and air lime as described in the standard EN 459-1:2015. Pozzolanes and latent hydraulic materials preferably are selected from the group consisting of clay, calcined clay, especially metakaolin, kiln dust, microsilica, fly ash, sodo-calcic glass, boro-calcic glass, recycled glass, zeolite, rice husk ash, burnt oil shale, and natural pozzolane such as pumice and trass. Geopolymers are alumo-siliceous polymers. One particular example of a geopolymer is furnace slag activated with water glass.

Construction materials within the present context optionally comprise further aggregates. Aggregates can be any material that is non-reactive in the hydration reaction of hydraulic binders. Aggregates can be any aggregate typically used for construction materials. Typical aggregates are for example rock, crushed stone, gravel, sand, especially quartz sand, river sand and/or manufactured sand, recycled concrete, glass, expanded glass, hollow glass beads, glass ceramics, volcanic rock, pumice, perlite, vermiculite, quarry wastes, raw, fired or fused earth or clay, porcelain, electrofused or sintered abrasives, firing support, silica xerogels. Aggregates may also be fine aggregates or fillers such as ground limestone, ground dolomite, and/or ground aluminum oxide. Aggregates useful for the present invention can have any shape and size typically encountered for such aggregates. An especially preferred aggregate is sand. Sand is a naturally occurring granular material composed of finely divided rock or mineral particles. It is available in various forms and sizes. Examples of suitable sands are quartz sand, limestone sand, river sand or crushed aggregates. Suitable sands are for example described in standards ASTM C778 or EN 196-1.

According to embodiments, aggregates can also be one or more of the following (i)-(v):

(i) biosourced materials, preferably of plant origin, more preferably biosourced materials of plant origin essentially composed of cellulose and/or lignin, especially biosourced materials selected from the group comprising or consisting of hemp, flax, cereal straw, oats, rice, rape, maize, sorghum, flax, *miscanthus*, rice husk, sugar cane, sunflower, kenaf, coconut, olive stones, bamboo, wood, or mixtures thereof. According to embodiments, biosourced materials of plant origin have a defined form which is preferably selected from fibres, fibrils, dust, powders, shavings, pith, in particular pith of sunflower, maize, rapeseed, and mixtures thereof.

(ii) synthetic non-mineral materials, preferably selected from the group comprising or consisting of thermoplastic, thermosetting plastics, elastomers, rubbers, textiles fibers, plastic materials reinforced with glass or carbon fibres. Synthetic non-mineral materials can be filled or unfilled.

(iii) aggregates of inorganic nature from the deconstruction of civil engineering or building structures, preferably selected from the group comprising or consisting of waste concrete, mortar, bricks, natural stone, asphalt, tiles, tiling, aerated concrete, clinker, scrap metal.

(iv) aggregates of organic nature from the recycling of industrial products, in particular composite materials which are difficult to recycle, especially recycled insulating materials. Especially preferred examples are polystyrenes, polyurethanes, phenolic resins, wood insulating materials, and mixtures thereof.

(v) non-hazardous granular materials usually destined for landfill such as used foundry sands, catalyst supports, Bayer process de-soding treatment supports, clinker aggregates, fillers from the treatment of excavation sludge, sewage sludge, slurry, paper waste, paper incineration ashes, household waste incineration ashes.

Most preferably, aggregates are in particulate form.

Optionally, a construction material of the present invention may additionally comprise least one additive selected from the group consisting of plasticizers, superplasticizers, shrinkage reducers, air entrainers, de-aerating agents, stabilizers, viscosity modifiers, water reducers, accelerators, retarders, water resisting agents, strength enhancing additives, fibres, blowing agents, defoamers, redispersible polymer powders, chromate reducers, pigments, and steel passivating agents.

A construction material of the present invention can be in a dry state. Typically, dry construction materials are in the form of powders. A dry construction material can especially be a dry mortar or a dry concrete. Dry construction materials preferably have a water content of not more than 5 w %, more preferably not more than 2 w %, especially not more than 1 w %, in each case relative to the total weight of binder present in the dry construction material.

A construction material of the present invention can also be in the wet state. Typically, wet construction materials are in the form of slurries in water. A wet construction material can especially be a dry mortar or dry concrete mixed with water. Wet construction materials preferably have a mass ratio of water:mineral binder between 0.1-0.8, preferably 0.25-0.6, especially 0.3-0.5.

A construction material of the present invention can also be in the hardened state. Hardening of a dry construction material of the present invention starts when water is added. Upon hardening the construction material attains its final strength. A hardened construction material can have any desired form. A hardened construction material can be a building or be part of a building.

Especially, a construction material can be a dry concrete or a dry mortar.

A construction material of the present invention comprises or consists of (in each case relative to the total dry mass of the construction material)

a) 1-99 w % of a ground steel making slag as described above;
b) 1-99 w % of at least one mineral binder, preferably selected from the group consisting of cement, gypsum, lime, latent hydraulic binders, pozzolanes, and geopolymers;
c) optionally 15-85 w % of aggregates;
d) optionally 0.1-10 w % of further additives; and
e) optionally water in an amount to realize a mass ratio of water:mineral binder between 0.1-0.8, preferably 0.25-0.6, especially 0.3-0.5.

According to embodiments, a construction material of the present invention comprises a) 5-75 w %, preferably 6-20 w % or 25-75 w % of a ground steel making slag as described above;
b) 1-75 w %, preferably 5-50 w % of at least one mineral binder, preferably selected from the group consisting of cement, gypsum, lime, latent hydraulic binders, pozzolanes, and geopolymers;
c) 15-85 w % of aggregates;
d) optionally 0.1-10 w % of further additives; and
e) optionally water in an amount to realize a mass ratio of water:mineral binder between 0.1-0.8, preferably 0.25-0.6, especially 0.3-0.5.

According to further embodiments, a construction material of the present invention consists of a) 5-75 w %, preferably 6-20 w % or 25-75 w % of a ground steel making slag as described above;
b) 1-75 w %, preferably 5-50 w % of at least one mineral binder, preferably selected from the group consisting of cement, gypsum, lime, latent hydraulic binders, pozzolanes, and geopolymers;
c) 15-85 w % of aggregates;
d) optionally 0.1-10 w % of further additives; and
e) optionally water in an amount to realize a mass ratio of water:mineral binder between 0.1-0.8, preferably 0.25-0.6, especially 0.3-0.5.

According to further embodiments, a construction material of the present invention comprises a) 5-75 w %, preferably 6-20 w % or 25-75 w % of a ground basic oxygen slag as described above;
b) 1-75 w %, preferably 5-50 w % of Portland cement;
c) 15-85 w % of aggregates;
d) optionally 0.1-10 w % of further additives; and
e) optionally water in an amount to realize a mass ratio of water:mineral binder between 0.1-0.8, preferably 0.25-0.6, especially 0.3-0.5.

According to embodiments, a construction material of the present invention comprises or consists of (relative to the total dry mass of the construction material unless otherwise stated)

a) 0.9901-99 w % of a ground steel making slag;
a1) 0.001-3 w %, preferably 0.002-1 w %, more preferably 0.01-0.1 w %, relative to the total dry weight of the slag, of at least one additive selected from the group consisting of alkanolamines, glycols, glycerol, sugars, sugar acids, carboxylic acids or their salts, superplasticizers, and superabsorbent polymers;
b) 0.9901-99 w % of at least one mineral binder, preferably selected from the group consisting of cement, gypsum, lime, latent hydraulic binders, pozzolanes, and geopolymers; c) optionally 15-85 w % of aggregates;
d) optionally 0.1-10 w % of further additives; and
e) optionally water in an amount to realize a mass ratio of water:mineral binder between 0.1-0.8, preferably 0.25-0.6, especially 0.3-0.5.

All embodiments described above also apply to this embodiment. Especially the ground steel making slag is as described above and the at least one additive is selected from triisopropanolamine (TIPA), triethanolamine (TEA), diethanolisopropanolamine (DEIPA), ethanoldiisopropanolamine (EDIPA), or mixtures of at least one of TIPA, TEA, DEIPA, and EDIPA with at least one of diethylene glycol, glycerol, carboxylic acid, and sugar, preferably TIPA, TEA, DEIPA, EDIPA, lactic acid, malonic acid, adipic acid, citric acid, galactose, glucose, lactose, maltose, sucrose, fructose, diethylene glycol, glycerol, or mixtures thereof, more preferably TIPA, DEIPA, or a mixture of TIPA and DEIPA, or a mixture of TIPA and citric acid, or a mixture of TIPA and glucose, or a mixture of TIPA and fructose, or a mixture of TIPA and glycerol, or a mixture of TIPA and diethylene glycol, or a mixture of TIPA and sugar and glycerol, or a mixture of TIPA and sugar and diethylene glycol, or a mixture of TIPA and carboxylic acid and glycerol, or a mixture of TIPA and carboxylic acid and diethylene glycol, or a mixture of DEIPA and citric acid, or a mixture of DEIPA and glucose, or a mixture of DEIPA and fructose, or a mixture of DEIPA and glycerol, or a mixture of DEIPA and diethylene glycol, or a mixture of DEIPA and sugar and glycerol, or a mixture of DEIPA and sugar and diethylene glycol, or a mixture of DEIPA and carboxylic acid and glycerol, or a mixture of TIPA and carboxylic acid and diethylene glycol.

In a fourth aspect the present invention relates to a method to increase the efficiency of the dry grinding of steel making slag, characterized in that the steel making slag is dry ground together with an additive selected from triisopropanolamine (TIPA), triethanolamine (TEA), diethanolisopropanolamine (DEIPA), ethanoldiisopropanolamine (EDIPA), or mixtures of at least one of TIPA, TEA, DEIPA, and EDIPA with at least one of diethylene glycol, glycerol, carboxylic acid, and sugar, preferably TIPA, TEA, DEIPA, EDIPA, lactic acid, malonic acid, adipic acid, citric acid, galactose, glucose, lactose, maltose, sucrose, fructose, diethylene glycol, glycerol, or mixtures thereof, more preferably TIPA, DEIPA, or a mixture of TIPA and DEIPA, or a mixture of TIPA and citric acid, or a mixture of TIPA and glucose, or a mixture of TIPA and fructose, or a mixture of TIPA and glycerol, or a mixture of TIPA and diethylene glycol, or a mixture of TIPA and sugar and glycerol, or a mixture of TIPA and sugar and diethylene glycol, or a mixture of TIPA and carboxylic acid and glycerol, or a mixture of TIPA and carboxylic acid and diethylene glycol, or a mixture of DEIPA and citric acid, or a mixture of DEIPA and glucose, or a mixture of DEIPA and fructose, or a mixture of DEIPA and glycerol, or a mixture of DEIPA and diethylene glycol, or a mixture of DEIPA and sugar and glycerol, or a mixture of DEIPA and sugar and diethylene glycol, or a mixture of DEIPA and carboxylic acid and glycerol, or a mixture of TIPA and carboxylic acid and diethylene glycol, land that the additive is added to the slag prior and/or during grinding.

An increase in dry grinding efficiency is for example a shorter grinding time needed to obtain a given Blaine surface of the ground slag or the attainment of a higher Blaine surface for a given griding time. The Blaine surface can be measured as described above. An increase in dry grinding efficiency for example also is a lower amount of material sticking to parts of the mill during and after the grinding.

Thus, the present invention relates to a method to increase the efficiency of the dry grinding of steelmaking slag, said method comprising the steps of (i) providing a steel making slag, (ii) providing an additive selected from triisopropanolamine (TIPA), triethanolamine (TEA), diethanolisopropanolamine (DEIPA), ethanoldiisopropanolamine (EDIPA), or mixtures of at least one of TIPA, TEA, DEIPA, and EDIPA with at least one of diethylene glycol, glycerol, carboxylic acid, and sugar, preferably TIPA, TEA, DEIPA, EDIPA, lactic acid, malonic acid, adipic acid, citric acid, galactose, glucose, lactose, maltose, sucrose, fructose, diethylene glycol, glycerol, or mixtures thereof, more preferably TIPA, DEIPA, or a mixture of TIPA and DEIPA, or a mixture of TIPA and citric acid, or a mixture of TIPA and glucose, or a mixture of TIPA and fructose, or a mixture of TIPA and glycerol, or a mixture of TIPA and diethylene glycol, or a mixture of TIPA and sugar and glycerol, or a mixture of TIPA and sugar and diethylene glycol, or a mixture of TIPA and carboxylic acid and glycerol, or a mixture of TIPA and carboxylic acid and diethylene glycol, or a mixture of DEIPA and citric acid, or a mixture of DEIPA and glucose, or a mixture of DEIPA and fructose, or a mixture of DEIPA and glycerol, or a mixture of DEIPA and diethylene glycol, or a mixture of DEIPA and sugar and glycerol, or a mixture of DEIPA and sugar and diethylene glycol, or a mixture of DEIPA and carboxylic acid and glycerol, or a mixture of TIPA and carboxylic acid and diethylene glycol, (iii) dry grinding said steel making slag, and (iv) intermixing said additive with said steelmaking slag prior to and/or during step (iii).

All features and embodiments described above also apply to this aspect.

In a fifth aspect the present invention relates to a method to increase the early strength of a construction material comprising a ground steel making slag, characterized in that an additive is added to a steel making slag prior and/or during the grinding of said steel making slag and characterized in that the additive is selected from triisopropanolamine (TIPA), triethanolamine (TEA), diethanolisopropanolamine (DEIPA), ethanoldiisopropanolamine (EDIPA), or mixtures of at least one of TIPA, TEA, DEIPA, and EDIPA with at least one of diethylene glycol, glycerol, carboxylic acid, and sugar, preferably TIPA, TEA, DEIPA, EDIPA, lactic acid, malonic acid, adipic acid, citric acid, galactose, glucose, lactose, maltose, sucrose, fructose, diethylene glycol, glycerol, or mixtures thereof, more preferably TIPA, DEIPA, or a mixture of TIPA and DEIPA, or a mixture of TIPA and citric acid, or a mixture of TIPA and glucose, or a mixture of TIPA and fructose, or a mixture of TIPA and glycerol, or a mixture of TIPA and diethylene glycol, or a mixture of TIPA and sugar and glycerol, or a mixture of TIPA and sugar and diethylene glycol, or a mixture of TIPA and carboxylic acid and glycerol, or a mixture of TIPA and carboxylic acid and diethylene glycol, or a mixture of DEIPA and citric acid, or a mixture of DEIPA and glucose, or a mixture of DEIPA and fructose, or a mixture of DEIPA and glycerol, or a mixture of DEIPA and diethylene glycol, or a mixture of DEIPA and sugar and glycerol, or a mixture of DEIPA and sugar and diethylene glycol, or a mixture of DEIPA and carboxylic acid and glycerol, or a mixture of TIPA and carboxylic acid and diethylene glycol. There is no step of completely extracting the grinding additive from the ground steel making slag after the dry grinding.

The early strength relates to the compressive strength and/or flexural strength of a construction material after hardening for not more than 7 days, preferably after hardening for 7 days. Compressive strength can be measured according to standard EN 12190 on 4×4×16 cm prisms. Flexural strength can be measured according to standard EN 196-1 on prisms 40×40×160 mm.

In particular, the early strength of a construction material comprising a ground steel making slag of the present invention is improved over the same construction material but comprising a ground steel making slag with the same Blaine surface and/or particle size and ground without the addition of an additive of the present invention.

Thus, the present invention relates to a method to increase the early strength of a cementitious material comprising a ground steel making slag, said method comprising the steps of (i) providing a ground steel making slag, (ii) intermixing said ground steel making slag with at least one mineral binder, (iii) optionally intermixing the mixture obtained in step (ii) with aggregates and further additives, and (iv) optionally intermixing the mixture obtained in step (ii) or (iii) with water.

All features and embodiments described above also apply to this aspect.

According to particular embodiments, the method is characterized in that the ground steel making slag comprises an additive selected from triisopropanolamine (TIPA), triethanolamine (TEA), diethanolisopropanolamine (DEIPA), ethanoldiisopropanolamine (EDIPA), or mixtures of at least one of TIPA, TEA, DEIPA, and EDIPA with at least one of diethylene glycol, glycerol, carboxylic acid, and sugar, preferably TIPA, TEA, DEIPA, EDIPA, lactic acid, malonic acid, adipic acid, citric acid, galactose, glucose, lactose, maltose, sucrose, fructose, diethylene glycol, glycerol, or mixtures thereof, more preferably TIPA, DEIPA, or a mixture of TIPA and DEIPA, or a mixture of TIPA and citric acid, or a mixture of TIPA and glucose, or a mixture of TIPA and fructose, or a mixture of TIPA and glycerol, or a mixture of TIPA and diethylene glycol, or a mixture of TIPA and sugar and glycerol, or a mixture of TIPA and sugar and diethylene glycol, or a mixture of TIPA and carboxylic acid and glycerol, or a mixture of TIPA and carboxylic acid and diethylene glycol, or a mixture of DEIPA and citric acid, or a mixture of DEIPA and glucose, or a mixture of DEIPA and fructose, or a mixture of DEIPA and glycerol, or a mixture of DEIPA and diethylene glycol, or a mixture of DEIPA and sugar and glycerol, or a mixture of DEIPA and sugar and diethylene glycol, or a mixture of DEIPA and carboxylic acid and glycerol, or a mixture of TIPA and carboxylic acid and diethylene glycol, which additive was added to said steel making slag prior and/or during the grinding of said steel making slag.

The following examples will provide the person skilled in the art with further details and embodiments of the present invention.

EXAMPLES

The following table 1 shoes an overview of the raw materials used.

TABLE 1

| raw materials | |
|---|---|
| BOF slag | Basic oxygen furnace slag with an initial Blaine surface of 1410 g/cm$^2$ 56% retained on 45 μm sieve; 68% retained on 32 μm sieve |
| TIPA | Triisopropanolamine (1,1',1''-nitrilotris(propan-2-ol)), Sigma-Aldrich, 95% purity |
| TEA | Triethanolamine, Sigma-Aldrich, >99% purity |
| DEIPA | Diethanolisopropanolamine, Sigma-Aldrich, 94% purity |
| EDIPA | Ethanoldiisopropanolamine, 95% purity |
| Polyaspartic acid | Baypure |
| Lactic acid | Sigma-Aldrich, >98% purity |
| Malonic acid | Sigma-Aldrich, 99% purity |
| Adipic acid | Sigma-Aldrich, 99% purity |
| Citric acid | Sigma-Aldrich, 99% purity |
| Calcium lactate | As pentahydrate, Sigma-Aldrich |
| Fructose | D-(−)-Fructose, Sigma-Aldrich, >99% purity |
| Glucose | D-(+)-Glucose, Sigma-Aldrich, >99.5% purity |
| GLY | Glycerol, Sigma-Aldrich, >99.0% purity |
| DEG | Diethylenglycol, Sigma-Aldrich, >99.0% purity |
| TiBp | Triisobutyl phosphate, Sigma-Aldrich, >99.0% purity |

Measurement of Elaine surface was done according to standard NF EN 196-6.

Sieve analysis was done according to standard ASTM C136/C136M.

Determination of amount of material sticking to balls and vessel was determined by weighing. Compressive strength was measured according to EN 12190 on 4×4×16 cm prisms after 7 d curing at 23° C./50% r.h. of a mixture consisting of 90 w % BOF slag milled as per the respective example, 10 w % of hydrated air lime and mixed with water in a weight ratio of water:powder of 0.36.

Example 1

90 g of BOF slag was heated to 100° C. and was then charged into a ball mill. 260 g of steel balls were then added (vessel and balls were pre-heated to 100° C.). Then the respective grinding additives as shown in the following table 2 were added in an amount of 0.015 w % relative to the weight of the BOF slag. All grinding additives were diluted with water prior to addition in an amount to introduce 0.06 w % of water relative to the BOF slag. In case where a mixture of two grinding additives was used, each of the grinding additives was introduced in an amount of 0.015 w % relative to the weight of the BOF slag and the mixture was diluted in water prior to addition in an amount to introduce 0.06 w % of water relative to the BOF slag.

Milling was then effected for 5 minutes. After this time, a sample was taken for the analysis of Blaine surface and milling was continued for another 5 minutes. After the total milling time of 10 minutes, the Blaine surface of the resulting slag was measured, and the amount of material sticking to the balls and vessel was determined.

The following table 2 gives an overview of the results. Example 1 is a comparative example not according to the invention. Examples 2-13 are according to the present invention.

TABLE 2

Results

| | 1 | 2 | 3 | 4 | 5 | 6 | 7 | 8 |
|---|---|---|---|---|---|---|---|---|
| Grinding additive type | none | TIPA | TEA | DEIPA | EDIPA | Polyaspartic acid | Lactic acid | Adipic acid |
| Blaine @ 5 min [g/cm$^2$] | 2050 | 2250 | 2340 | 2900 | 2250 | 2220 | 2320 | 2160 |
| Blaine @ 10 min [g/cm$^2$] | 2470 | 2630 | 2630 | 3220 | 2640 | 2630 | 2770 | 2700 |
| Residue on 45 μm sieve [%] | 22 | 21 | 15 | 13 | 13 | 14 | 16 | 22 |
| Residue on 32 μm sieve [%] | 48 | 42 | 37 | 29 | 40 | 32 | 37 | 37 |
| Material sticking*[1] [%] | 14 | 11 | 10 | 4 | 10 | 8 | 5 | 5 |
| Compressive strength [MPa] | 0.7 | 9.7 | n.m. | 7.6 | n.m. | n.m. | n.m. | n.m. |

| | 9 | 10 | 11 | 12 | 13 |
|---|---|---|---|---|---|
| Grinding additive type | Malonic acid | Calcium lactate | TIPA & Glucose | TIPA & Fructose | TIPA & citric acid |
| Blaine @ 5 min [g/cm$^2$] | 2390 | 2480 | 2630 | 2520 | 2520 |
| Blaine @ 10 min [g/cm$^2$] | 2710 | 2670 | 2850 | 2950 | 3170 |
| Residue on 45 μm sieve [%] | 19 | 16 | 22 | 18 | 18 |

TABLE 2-continued

| Results | | | | | |
|---|---|---|---|---|---|
| Residue on 32 μm sieve [%] | 40 | 41 | 38 | 35 | 38 |
| Material sticking*[1] [%] | 7 | 4 | 8 | 5 | 4 |

*[1]sum of material sticking to balls and vessel relative to the total BOF slag introduced
n.m.: not measured As can be seen from the above results, the addition of an additive during dry grinding of basic oxygen slag leads to a higher Blaine surface obtainable after 5 min or after 10 min of grinding. This means that the grinding efficiency is higher with the respective grinding additive added. A higher Blaine surface can be obtained within the same grinding time or less time is needed to grind the BOF slag to a desired Blaine surface.

It can also be seen from the above results, that the inventive use of grinding additives during grinding leads to a ground BOF slag comprising more fine particles. Meaning that the overall particle size is reduced. This is obvious from a lower amount of particles being retained on a 45 μm or 32 μm sieve in case where grinding was done with the additive as compared to where no additive was added.

Finally, it can be seen from the above results, that the inventive use of grinding additives leads to a lower amount of ground material sticking to the balls and vessel of the ball mill. This is also an indication of increased grinding efficiency.

Example 2

Example 2 was conducted in the same way as example 1. Except that the type of grinding additives and amounts thereof were used as indicated in below table 3. Examples 14-42 are according to the present invention.

TABLE 3

| Results | | | | |
|---|---|---|---|---|
| | 14 | 15 | 16 | 17 |
| Grinding additive type | TIPA & DEIPA (25:75 w %) | TIPA & DEIPA (50:50 w %) | TIPA & DEIPA (75:25 w %) | TIPA & DEIPA (75:25 w %) |
| Total amount of grinding additive added*[1] | 0.015 | 0.015 | 0.015 | 0.075 |
| Blaine @ 5 min [g/cm$^2$] | 2260 | 2310 | 2520 | 3170 |
| Blaine @ 10 min [g/cm$^2$] | 2920 | 2830 | 3030 | 3400 |
| Residue on 45 μm sieve [%] | 14 | 5 | 6 | 8 |
| Residue on 32 μm sieve [%] | 34 | 39 | 33 | 24 |
| Material sticking*[2] [%] | 2.5 | 1.9 | 2 | 0.9 |
| Compressive strength [MPa] | 6.5 | 6.1 | 6.5 | 8.9 |
| | 18 | 19 | 20 | 21 |
| Grinding additive type | TIPA & GLY (50:50 w %) | DEIPA & GLY (50:50 w %) | TIPA & DEG (50:50 w %) | DEIPA & DEG (50:50 w %) |
| Total amount of grinding additive added*[1] | 0.015 | 0.015 | 0.015 | 0.015 |
| Blaine @ 5 min [g/cm$^2$] | 2320 | 2470 | 2370 | 2390 |
| Blaine @ 10 min [g/cm$^2$] | 3020 | 2470 | 2370 | 2390 |
| Residue on 45 μm sieve [%] | 12 | 14 | 13 | 4 |
| Residue on 32 μm sieve [%] | 39 | 30 | 32 | 30 |
| Material sticking*[2] [%] | 1.6 | 1.6 | 1.9 | 1.8 |
| Compressive strength [MPa] | 6.8 | 7.1 | 6.6 | 6.5 |
| | 22 | 23 | 24 | 25 |
| Grinding additive type | TIPA & DEG (80:20 w %) | TIPA & DEG (30:70 w %) | DEIPA & DEG (60:40 w %) | DEIPA & DEG (33:66 w %) |
| Total amount of grinding additive added*[1] | 0.075 | 0.075 | 0.1 | 0.1 |

TABLE 3-continued

| Results | | | | |
|---|---|---|---|---|
| Blaine @ 5 min [g/cm²] | 2970 | 2750 | 3420 | 2860 |
| Blaine @ 10 min [g/cm²] | 3250 | 3250 | 3540 | 3390 |
| Residue on 45 µm sieve [%] | 6 | 10 | 4 | 15 |
| Residue on 32 µm sieve [%] | 22 | 25 | 22 | 20 |
| Material sticking*2 [%] | 0.9 | 1.3 | 0.7 | 0.8 |
| Compressive strength [MPa] | 10 | 6.9 | 10.6 | 10.5 |

| | 26 | 27 | 28 | 29 |
|---|---|---|---|---|
| Grinding additive type | TIPA & GLY (60:40 w %) | TIPA & GLY (14:86 w %) | DEIPA & GLY (60:40 w %) | DEIPA & GLY (33:66 w %) |
| Total amount of grinding additive added*1 | 0.1 | 0.1 | 0.1 | 0.1 |
| Blaine @ 5 min [g/cm²] | 3090 | 2760 | 3170 | 2930 |
| Blaine @ 10 min [g/cm²] | 3380 | 3250 | 3390 | 3410 |
| Residue on 45 µm sieve [%] | 6 | 10 | 6 | 15 |
| Residue on 32 µm sieve [%] | 20 | 28 | 20 | 24 |
| Material sticking*2 [%] | 0.8 | 1.3 | 1.0 | 1.5 |
| Compressive strength [MPa] | 10.0 | 10.1 | 11.4 | 10.2 |

| | 30 | 31 | 32 | 33 | 34 |
|---|---|---|---|---|---|
| Grinding additive type | TIPA | TIPA | DEIPA | DEIPA | TEA |
| Total amount of grinding additive added*1 | 0.1 | 0.15 | 0.1 | 0.15 | 0.06 |
| Blaine @ 5 min [g/cm²] | 3390 | 3310 | 3540 | 3580 | n.m. |
| Blaine @ 10 min [g/cm²] | 3600 | 3900 | 3370 | 3910 | 2720 |
| Residue on 45 µm sieve [%] | 7 | 5 | 6 | 11 | 25 |
| Residue on 32 µm sieve [%] | 24 | 21 | 25 | 22 | 36 |
| Material sticking*2 [%] | 0.7 | 0.6 | 0.9 | 0.7 | 2.1 |
| Compressive strength [MPa] | 9.9 | 15.9 | 10.6 | 12.3 | 4 |

| | 35 | 36 | 37 | 39 |
|---|---|---|---|---|
| Grinding additive type | DEIPA + glucose (50:50 w %) | DEIPA + citric acid (50:50 w %) | TIPA + Glucose + DEG (13:13:74 w %) | TIPA + citric acid + DEG (13:13:74 w %) |
| Total amount of grinding additive added*1 | 0.06 | 0.06 | 0.12 | 0.12 |
| Blaine @ 5 min [g/cm²] | 2520 | 2330 | 2860 | 2790 |
| Blaine @ 10 min [g/cm²] | 3010 | 3080 | 3300 | 3300 |
| Residue on 45 µm sieve [%] | 17 | 19 | 18 | 17 |
| Residue on 32 µm sieve [%] | 32 | 31 | 29 | 26 |
| Material sticking*2 [%] | 1.7 | 1.3 | 0.9 | 1.0 |
| Compressive strength [MPa] | 8.6 | 8.6 | n.m. | n.m. |

| | 40 | 41 | 42 |
|---|---|---|---|
| Grinding additive type | DEIPA + fructose + GLY (30:30:40 w %) | TIPA + DEG + TiBp (49.8:49.8:0.4 w %) | DEIPA + DEG + TiBp (24.9:74.7:0.4 w %) |
| Total amount of | 0.1 | 0.12 | 0.12 |

TABLE 3-continued

| Results | | | |
|---|---|---|---|
| grinding additive added*1 | | | |
| Blaine @ 5 min [g/cm$^2$] | 2780 | 3330 | 2950 |
| Blaine @ 10 min [g/cm$^2$] | 3310 | 3620 | 3500 |
| Residue on 45 μm sieve [%] | 20 | 15 | 15 |
| Residue on 32 μm sieve [%] | 26 | 24 | 24 |
| Material sticking*2 [%] | 1.5 | 0.6 | 1.0 |
| Compressive strength [MPa] | n.m. | 8.2 | 8.9 |

*1in w % relative to the weight of the BOF slag

*2sum of material sticking to balls and vessel relative to the total BOF slag introduced n.m.: not measured

The invention claimed is:

1. A method of dry grinding of steel making slag, comprising dry grinding a steel making slag together with a grinding additive selected from the group consisting of mixtures of triisopropanolamine and diethanolisopropanolamine, or from mixtures of at least one of triisopropanolamine, triethanolamine, diethanolisopropanolamine, and ethanoldiisopropanolamine with at least one of diethylene glycol, glycerol, carboxylic acid, and sugar.

2. The method according to claim 1, wherein the steel making slag is a basic oxygen furnace slag.

3. The method according to claim 1, wherein the steel making slag has a content of iron oxides expressed as $Fe_2O_3$ of 8-38 w %, and a content of sulfur expressed as $SO_3$ of $<1$ w %, in each case relative to a total dry weight of the steel making slag.

4. The method according to claim 1, wherein the grinding additive is selected from the group consisting of mixtures of at least one of triisopropanolamine, triethanolamine, diethanolisopropanolamine, and ethanoldiisopropanolamine with at least one of the carboxylic acids selected from the group consisting of lactic acid, malonic acid, adipic acid and citric acid, the sugar selected from the group consisting of galactose, glucose, lactose, maltose, sucrose and fructose, diethylene glycol, and glycerol.

5. The method according to claim 4, wherein the grinding additive is selected from the group consisting of a mixture of triisopropanolamine and citric acid, a mixture of triisopropanolamine and glucose, a mixture of triisopropanolamine and fructose, a mixture of triisopropanolamine and glycerol, a mixture of triisopropanolamine and diethylene glycol, a mixture of triisopropanolamine and sugar and glycerol, a mixture of triisopropanolamine and sugar and diethylene glycol, a mixture of triisopropanolamine and carboxylic acid and glycerol, a mixture of triisopropanolamine and carboxylic acid and diethylene glycol, a mixture of diethanolisopropanolamine and citric acid, a mixture of diethanolisopropanolamine and glucose, a mixture of diethanolisopropanolamine and fructose, a mixture of diethanolisopropanolamine and glycerol, a mixture of diethanolisopropanolamine and diethylene glycol, a mixture of diethanolisopropanolamine and sugar and glycerol, a mixture of diethanolisopropanolamine and sugar and diethylene glycol, and a mixture of diethanolisopropanolamine and carboxylic acid and glycerol.

6. The method according to claim 1, wherein the grinding additive additionally comprises a defoamer.

7. The method according to claim 1, wherein an amount of water present during grinding is not higher than 1 w %, relative to a total dry weight of the slag.

8. The method as claimed in claim 1, wherein the grinding additive is added to the steel making slag before and/or during grinding in a total amount of between 0.001-3 w %, relative to a total dry weight of the slag.

9. The method as claimed in claim 1, wherein the grinding is done in an attrition mill or a compressive grinder.

10. A ground steelmaking slag obtained by dry grinding a steel making slag in the presence of a grinding additive selected form the group consisting of mixtures of triisopropanolamine and diethanolisopropanolamine, or from mixtures of at least one of triisopropanolamine triethanolamine diethanolisopropanolamine, and ethanoldiisopropanolamine with at least one of diethylene glycol, glycerol, carboxylic acid, and sugar.

11. A ground steelmaking slag according to claim 10, wherein the steel making slag is a basic oxygen furnace slag and wherein the grinding additive is selected from the group consisting of mixtures of at least one of triisopropanolamine and diethanolisopropanolamine with at least one of diethylene glycol, glycerol, carboxylic acid, and sugar.

12. Construction material comprising a ground steelmaking slag as claimed in claim 10.

13. A construction material as claimed in claim 12 comprising a) 5-95 w % of a ground steel making slag;

b) 5-95 w % of at least one mineral binder;

c) optionally 15-85 w % of aggregates;

d) optionally 0.1-10 w % of further additives; and e) optionally water in an amount to realize a mass ratio of water:mineral binder between 0.1-0.8.

14. A method to increase the efficiency of the dry grinding of steel making slag, wherein the steel making slag is dry ground together with an additive selected from the group consisting of mixtures of triisopropanolamine and diethanolisopropanolamine, or from mixtures of at least one of triisopropanolamine, triethanolamine, diethanolisopropanolamine, and ethanoldiisopropanolamine with at least one of diethylene glycol, glycerol, carboxylic acid, and sugar, and wherein the additive is added to the slag prior and/or during grinding.

15. A method to increase the early strength of a cementitious material comprising a ground steel making slag, wherein an additive is added to the slag prior and/or during the grinding of the slag and wherein the additive is selected from the group consisting of mixtures of triisopropanolamine and diethanolisopropanolamine, or from mixtures of at least one of triisopropanolamine, triethanolamine, diethanolisopropanolamine, and ethanoldiisopropanolamine with at least one of diethylene glycol, glycerol, carboxylic acid, and sugar.

* * * * *